US010833720B2

(12) United States Patent
Bailey, Jr. et al.

(10) Patent No.: US 10,833,720 B2
(45) Date of Patent: Nov. 10, 2020

(54) WIRELESS CHARGING SYSTEM

(71) Applicant: Black & Decker Inc., Middle River, MD (US)

(72) Inventors: Rouse Roby Bailey, Jr., New Park, PA (US); Philip Gilde, Baltimore, MD (US); Steven J. Phillips, Ellicott City, MD (US); Stephen Gustafson, Towson, MD (US); Michael C. Doyle, Baldwin, MD (US); Suresh Srinivasan, Towson, MD (US)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 16/697,756

(22) Filed: Nov. 27, 2019

(65) Prior Publication Data

US 2020/0177225 A1    Jun. 4, 2020

Related U.S. Application Data

(60) Provisional application No. 62/772,799, filed on Nov. 29, 2018.

(51) Int. Cl.
*H04B 1/3888* (2015.01)
*H02J 7/02* (2016.01)

(52) U.S. Cl.
CPC .......... *H04B 1/3888* (2013.01); *H02J 7/025* (2013.01)

(58) Field of Classification Search
CPC ... H04M 1/026; H04B 1/3833; H04B 1/3888; H02J 7/025; H02J 7/0042
See application file for complete search history.

(56) References Cited

U.S. PATENT DOCUMENTS

| | | | |
|---|---|---|---|
| 2017/0317458 A1* | 11/2017 | Byrne | H02J 7/0044 |
| 2018/0064224 A1* | 3/2018 | Brzezinski | H02J 7/0013 |
| 2018/0204672 A1* | 7/2018 | Mendoza Aguirre | H01F 41/041 |
| 2020/0083724 A1* | 3/2020 | Michaels | H02J 7/0044 |

* cited by examiner

*Primary Examiner* — Thanh C Le
(74) *Attorney, Agent, or Firm* — Michael Aronoff

(57) ABSTRACT

This application relates to a system and method for wirelessly charging battery packs. More particularly, the application relates to a system and method for wirelessly charging battery packs stored in a container. In one implementation, the system includes a sealable storage box having a transmitter for transmitting RF power to at least one battery pack stored in the storage box.

3 Claims, 17 Drawing Sheets

CONDUCTIVE LAYER THICKNESS CALCULATION

WIRELESS CHARGING SYSTEM

TECHNICAL FIELD

This application relates to a system and method for wirelessly charging battery packs. More particularly, the application relates to a system and method for wirelessly charging battery packs stored in a container. In one implementation, the system includes a sealable storage box having a transmitter for transmitting RF power to at least one battery pack stored in the storage box.

BACKGROUND

Overall objective of the program is to develop a storage box which can recharge products without making physical connections and without having to orient the product. Ideally, one can drop products into the box, close the lid, active charger and walk away.

SUMMARY

An aspect of the present invention includes a wireless charging jobsite storage box. The storage box includes an RF transmitter capable of providing wireless charging power to a receiver in stored in the box. The receiver may be incorporated in an adapter that is attachable to a rechargeable battery pack. Alternatively, the receiver may be integrated into a battery pack.

Implementations of this aspect may include one or more of the following features.

Advantages may include one or more of the following.

These and other advantages and features will be apparent from the description and the drawings.

DETAILED DESCRIPTION

Figure 1:
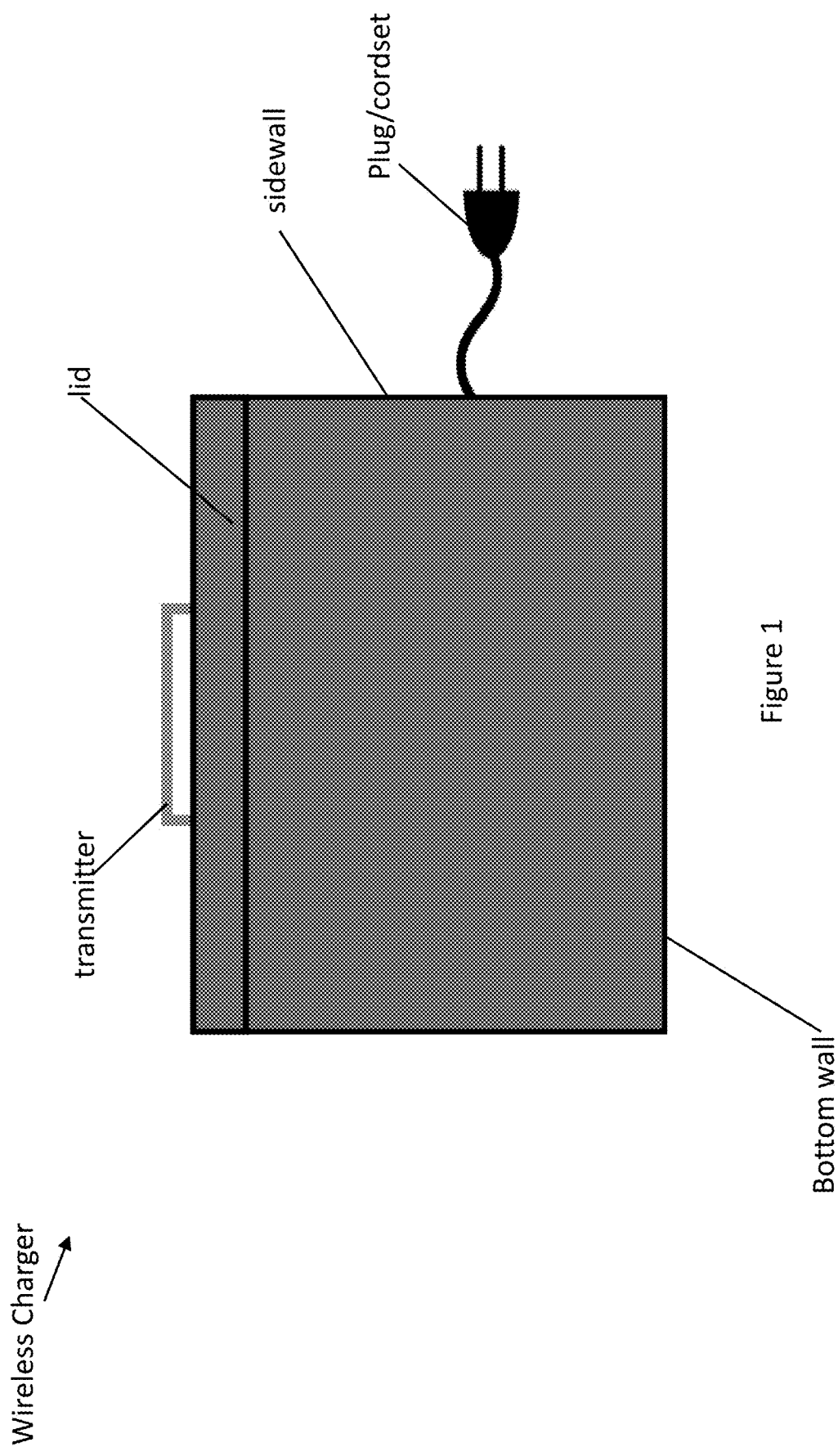
FIG. 1 is an exemplary embodiment of a wireless charger.
Figure 2:
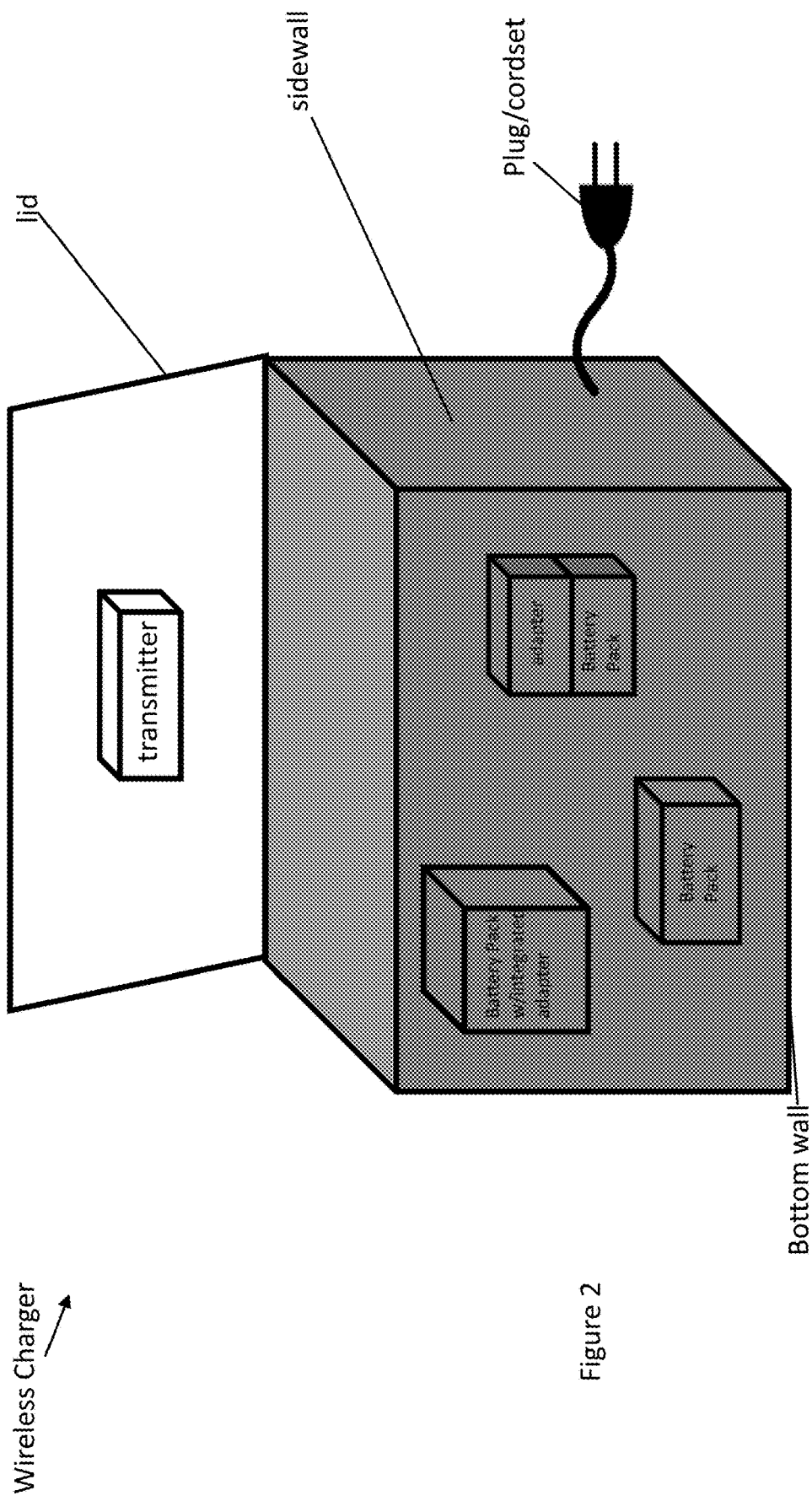
FIG. 2 is an additional rendering of the wireless charger of FIG. 1.

Referring to FIGS. 1 and 2, there is disclosed an exemplary embodiment of a wireless charging system. The system includes a box including a lid, four sidewalls and a bottom wall forming an internal cavity having a volume. The box may be any of a variety of geometric shapes creating the internal cavity. The lid may be attached to one of the sidewalls in a manner to allow the lid to be in an open position to enable devices to be placed in the internal cavity and in a closed position to seal the internal cavity. The lid may be attached to the sidewall by, for example, a set of hinges. The system may include a transmitter integrated in the lid. The system may also include a power cord and plug for connecting to a source of AC power, for example, a mains line AC outlet or a portable power generator. The plug/cord provides AC power to the AC/DC/RF converter for generating the RF power. The AC power may also be provided other components in the transmitter, as described in further detail below.

Current microwave ovens embed their transmitter in a wall of the cavity, as do all other RF style enclosures. The present exemplary embodiment incorporates a transmitter into the lid/door of wireless charging box. Most tool boxes are used to store a variety of tools and materials. These tools and materials are often haphazardly thrown into the tool boxes. By placing the transmitter in the lid/door, there is more space for tools and materials. The placement of the transmitter in the lid/door also avoids durability concerns of having a sensitive piece of electronics in a location that might sustain repeated impacts.

Overall objective of the program is to develop a storage box which can recharge products without making physical connections and without having to orient the product. Ideally, one can drop tools and/or battery packs or other products into the box, close the lid, activate the charging function and leave the battery packs to be charged.

The wireless power charging box uses radio frequency (RF) energy for delivering power "through the air" to a device to be charged within an internal cavity of the charging box. The RF energy flow occurs as follows: (1) provide input power (such as AC mains or DC battery/solar/wind, etc.); (2) convert the input power to RF power; (3) transmit the RF power; (4) receive the RF power; (5) convert the RF power to rectified DC power (electrical current); (6) input the DC power (electrical current) into a battery pack with an integrated receiver or an adaptor/receiver coupled to a battery pack and control charging current.

For good energy transfer, it is preferred that the RF energy is transmitted within an RF sealed cavity. It is also preferred that the cavity is effectively constructed of an electrically conductive material such as copper, aluminum, silver, gold or nickel. The desired material thickness to create a cavity with good energy characteristics is a function of RF operating frequency, conductivity of the effective cavity wall and permeability of the cavity wall.

Figure 3:
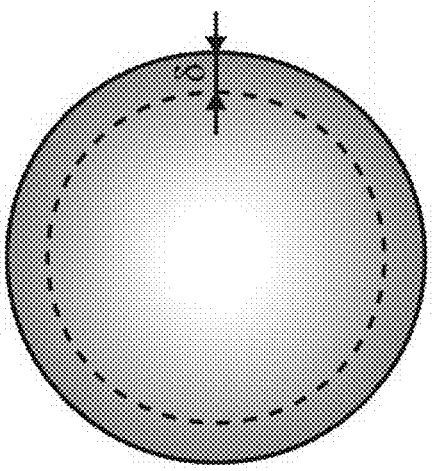
FIG. 3 is an exemplary illustration of a conductive layer of a wireless charger.

Referring to FIG. 3, for a cavity having a conductive shell of aluminum and transmitting the RF energy at 5.85 GHz:
$\rho = 2.6548$ μ·Ω·cm
$\mu r = 1.00002$ $\delta = 1.072$ μm A traditional high power (10 watts to 1000+watts) microwave cavity is typically a metal box where the box provides structure and the reflective/conductive cavity. However, the calculation illustrated in FIG. 3 shows the thickness of an exemplary aluminum conductive shell. In this example, the conductive shell may be only 1.072 micrometers at 5.85 GHz (2.711 micrometers at 915 MHz). Similar thicknesses are required for other conductive materials such as copper, nickel, gold or silver. If one separates the structural requirements from the reflective/conductive cavity requirements, a different solution set is possible.

The thin conductive materials defined by the above calculations will need to be protected to avoid damage in use, loading, handling and transport. A multi-layer construction is proposed to protect the conductive layer.

Figure 4B:
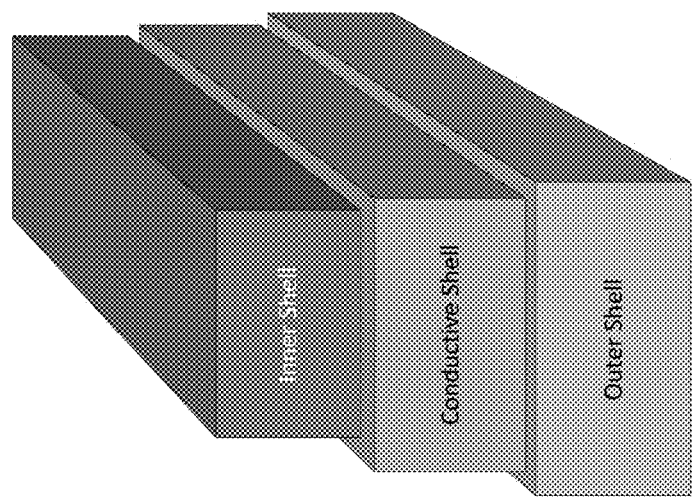
FIG. 4B is an additional exemplary illustration of the wireless charger of FIG. 1.
Figure 4A:
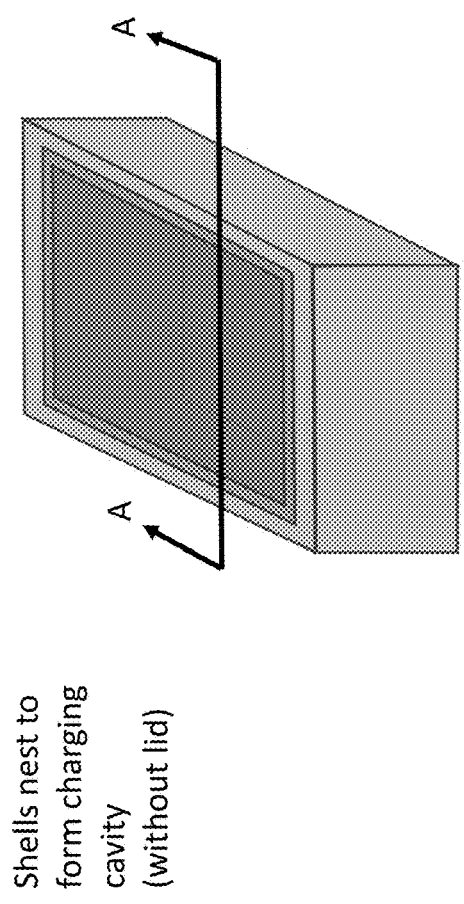
FIG. 4A is an exemplary illustration of the wireless charger of FIG. 1.
Figure 5:
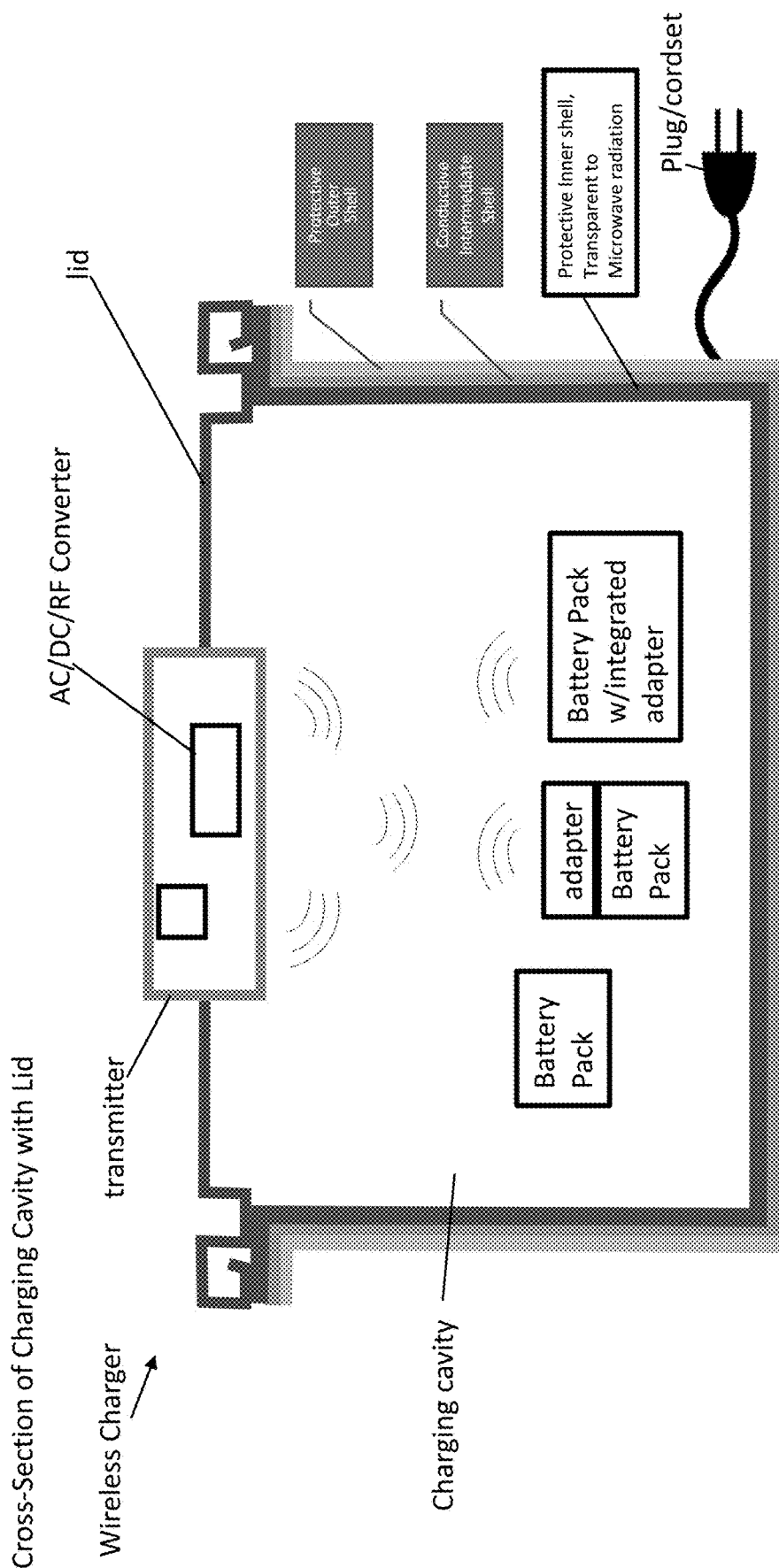
FIG. 5 is a section view along section line A-A of FIG. 4A of an exemplary embodiment of the wireless charger of FIG. 1.

In an exemplary embodiment illustrated in FIGS. 4A and 4B, a nested shell construction is envisioned for the wireless charging cavity. A protective outer shell is envisioned to be a (molded or thermo-formed) plastic material. A protective inner shell is also envisioned to be plastic with good RF transparency (low dielectric constant). A conductive, intermediate shell is sandwiched between the protective outer shell and the protective inner shell as illustrated in FIGS. 4-7. The conductive shell can be created in one of several ways: 1. Plating on the outer surface of the inner shell; 2. Plating on the inner surface of the outer shell; 3. Metal foil wrapped around outer surface of inner shell; 4. Drop-in metal stamping between inner shell and the outer shell; 5. Metal foil inserted into mold and plastic material injected over it (under it, etc.)—Insert molding with mold cavity used to form the metal foil Creating a conductive shell in the manner enables: 1. Low utilization of metals (cost savings); 2. Simplified assembly; 3. Nested construction protects conductive layer from rips, tears, gouges, etc. which is important because compromises in the conductive layer can result in RF leakage; 4. Lower overall weight It is desirable to be able to charge the battery in any orientation and location within the charging cavity.

By creating a space between the conductive layer and the adapter/receiver allows the RF energy to enter the adapter/receiver from other directions. This space can be achieved by positioning the inner shell relative to the conductive shell or incorporating spacer ribs on the interior of the inner shell or the exterior of the inner shell.

Figure 6:
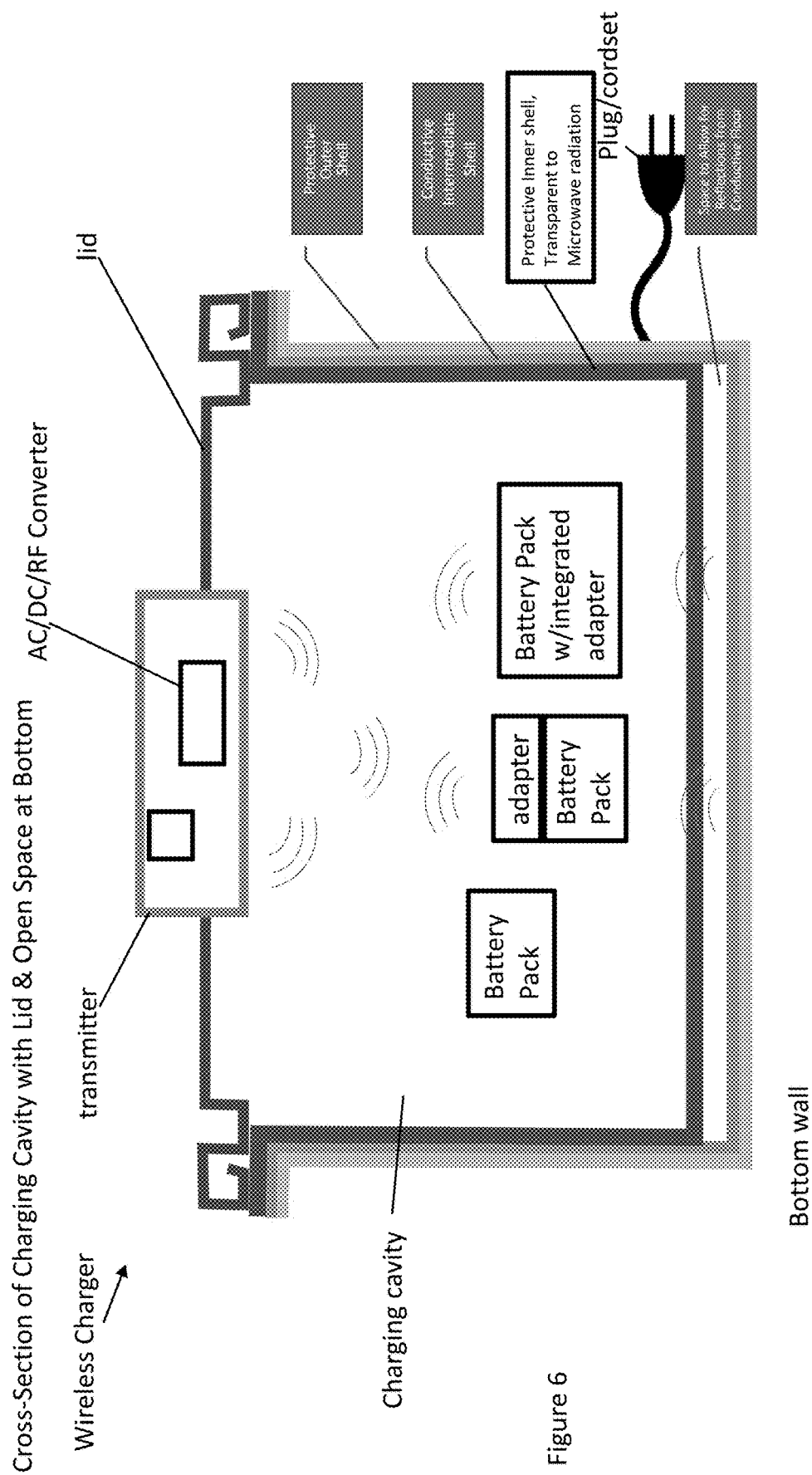
FIG. 6 is a section view along section line A-A of FIG. 4A of an exemplary embodiment of the wireless charger of FIG. 1.

In an exemplary embodiment illustrated in FIG. 6, the inner shell is spaced away from the conductive, intermediate shell at a bottom of the charging cavity. This allows the RF energy to reflect off the conductive layer (shell) at the bottom of the cavity and enter the adapter/receiver from behind, improving overall energy transfer into the adapter/receiver and reducing blind spots. This will be especially effective if the adapter/receiver (receiver antenna) is resting on the bottom of the charging cavity.

Figure 7:
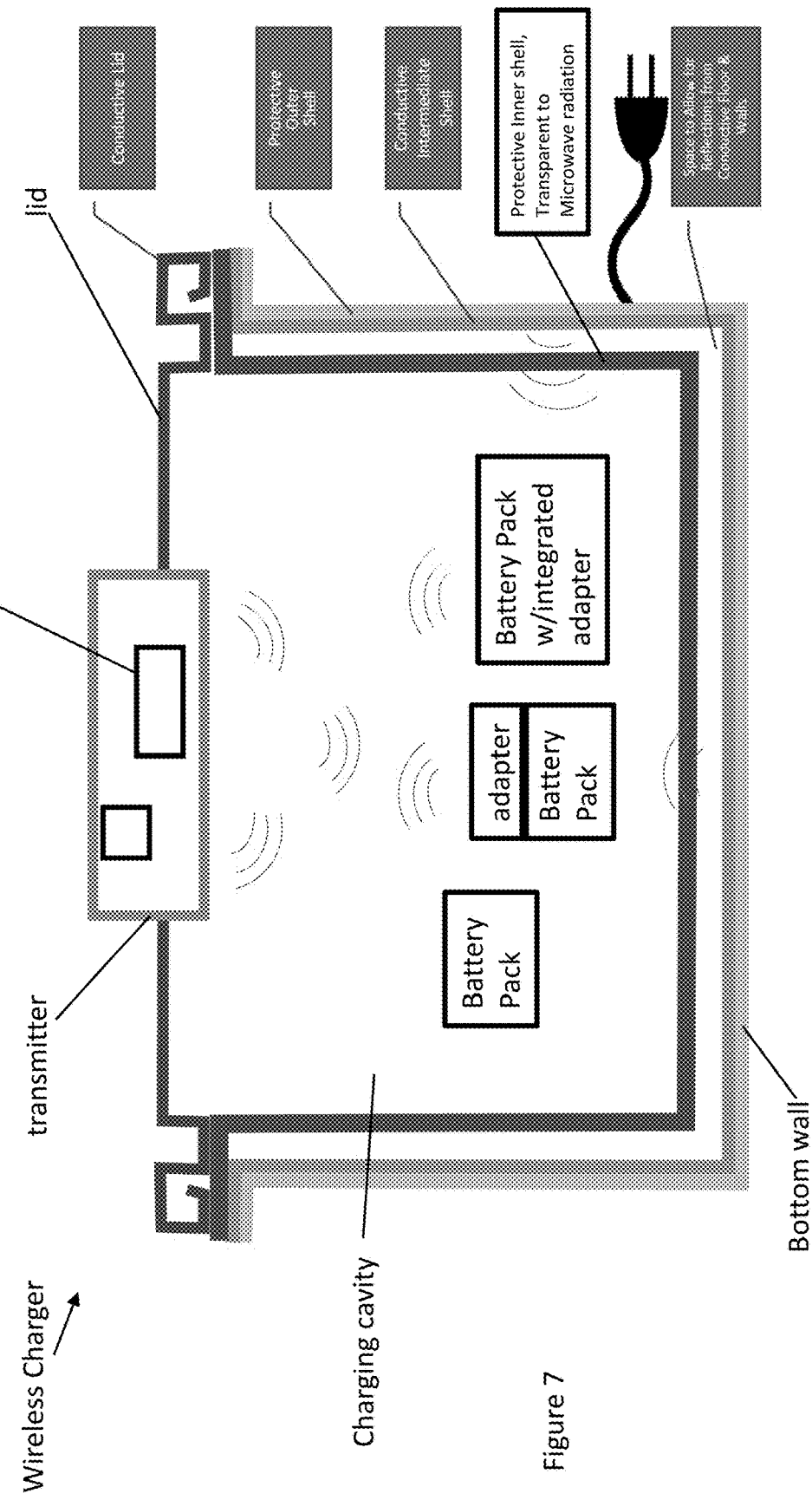
FIG. 7 is a section view along section line A-A of FIG. 4A of an exemplary embodiment of the wireless charger of FIG. 1.

In another exemplary embodiment illustrated in FIG. 7, the space between the conductive layer/shell and the inner shell is extended to include all four sidewalls and the bottom wall. In addition, the space could also be included in the lid/door such that the conductive layer is spaced away from the inner shell on all sides of the cavity.

Figure 8:
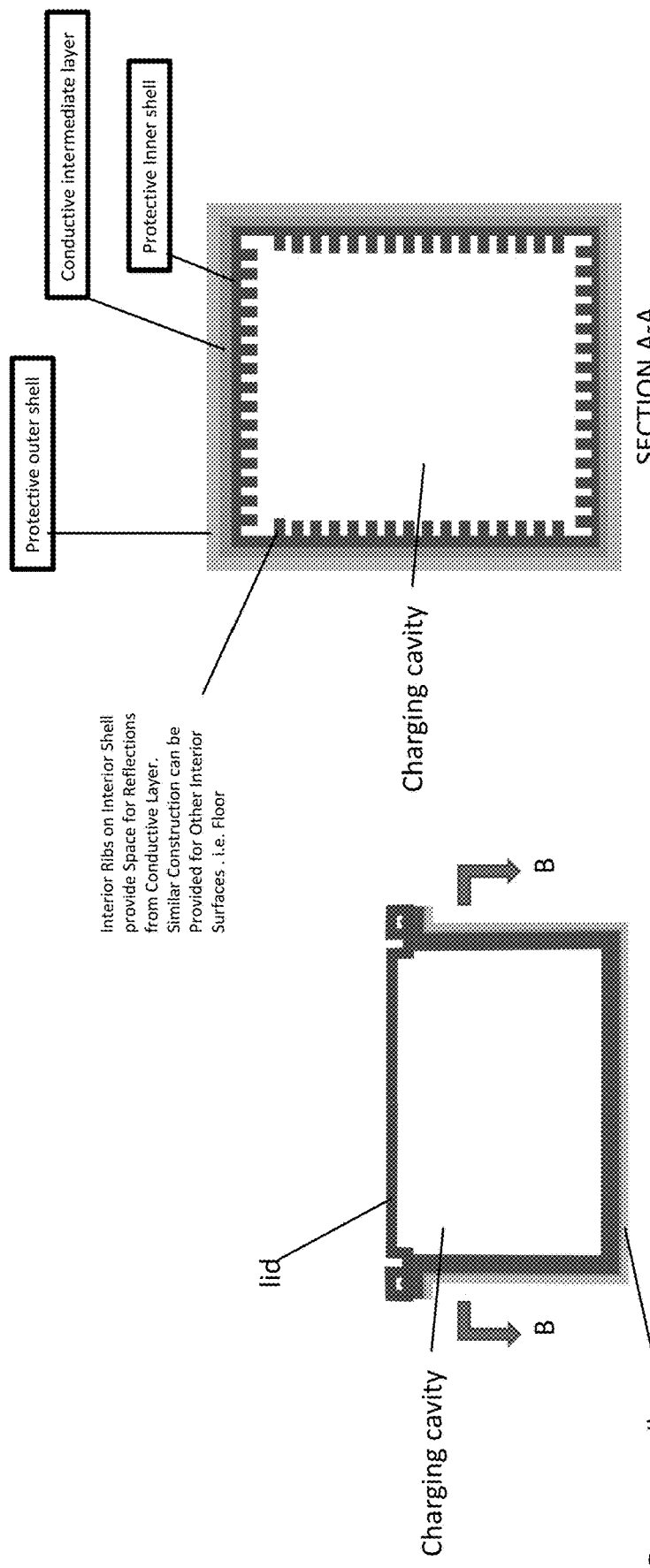
FIG. 8A is a section view along section line A-A of FIG. 4A of an exemplary embodiment of the wireless charger of FIG. 1.
FIG. 8B is a section view along section line B-B of FIG. 8A of an exemplary embodiment of the wireless charger of FIG. 1.

In another exemplary embodiment illustrated in FIGS. 8A and 8B, the inner shell is in intimate contact (or nearly so) with the conductive intermediate layer/shell. The inner shell has a series of ribs or other protrusions extending into the charging cavity which prevent the adapter/receiver (attached to a battery pack or integrated with a battery pack) from being placed too closely to the conductive layer. Alternatively, separate spacers could be employed or just a gap between the innermost shell and the conductive shell. As in the previous disclosure, the innermost shell should be "transparent" to RF energy.

This effectively creates the same effect as in the exemplary embodiments illustrated in FIGS. 6 and 7, allowing reflections off the conductive layer to enter the adapter/receiver from behind. Alternately, the ribs can be on the exterior of the inner shell, thus creating a gap between the conductive layer and the protective inner shell. Also, the spacer ribs could be a separate component.

It is desirable to provide a heated wireless charging cavity when temperatures are below a pre-defined set point.

As is well known, lithium ion batteries should not be charged below 0° Celsius (due to a risk of lithium plating on the anode). In cold climates, this can create significant inconvenience for the tool user. Using a fan in the transmitter housing to direct the waste heat from the AC/DC/RF converter of the transmitter into the charging cavity creates a warmer charging environment, allowing charging to take place or to take place at a higher rate.

Figure 9:
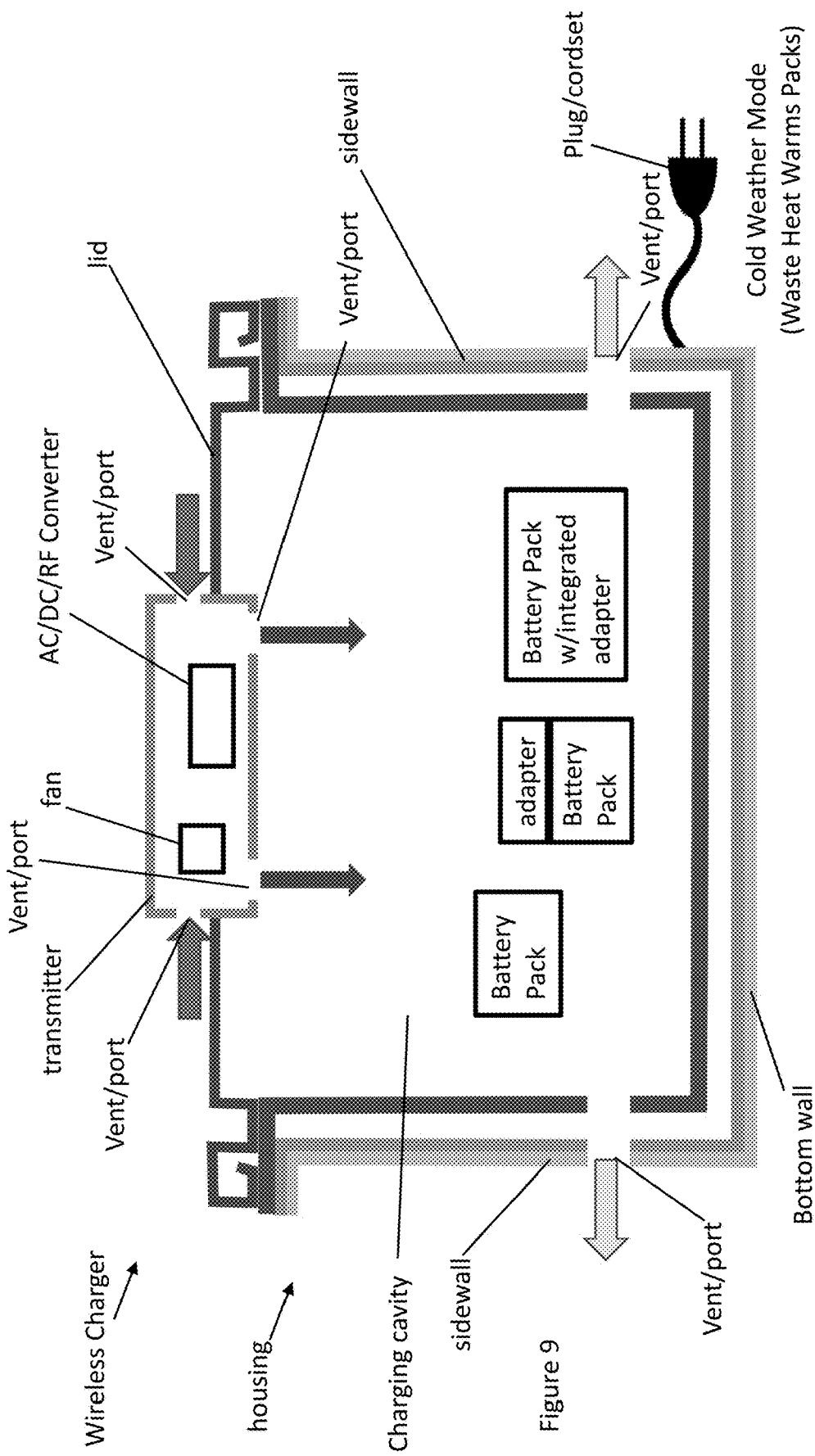
FIG. 9 is a section view along section line A-A of FIG. 4A of an exemplary embodiment of the wireless charger of FIG. 1.
Figure 10:
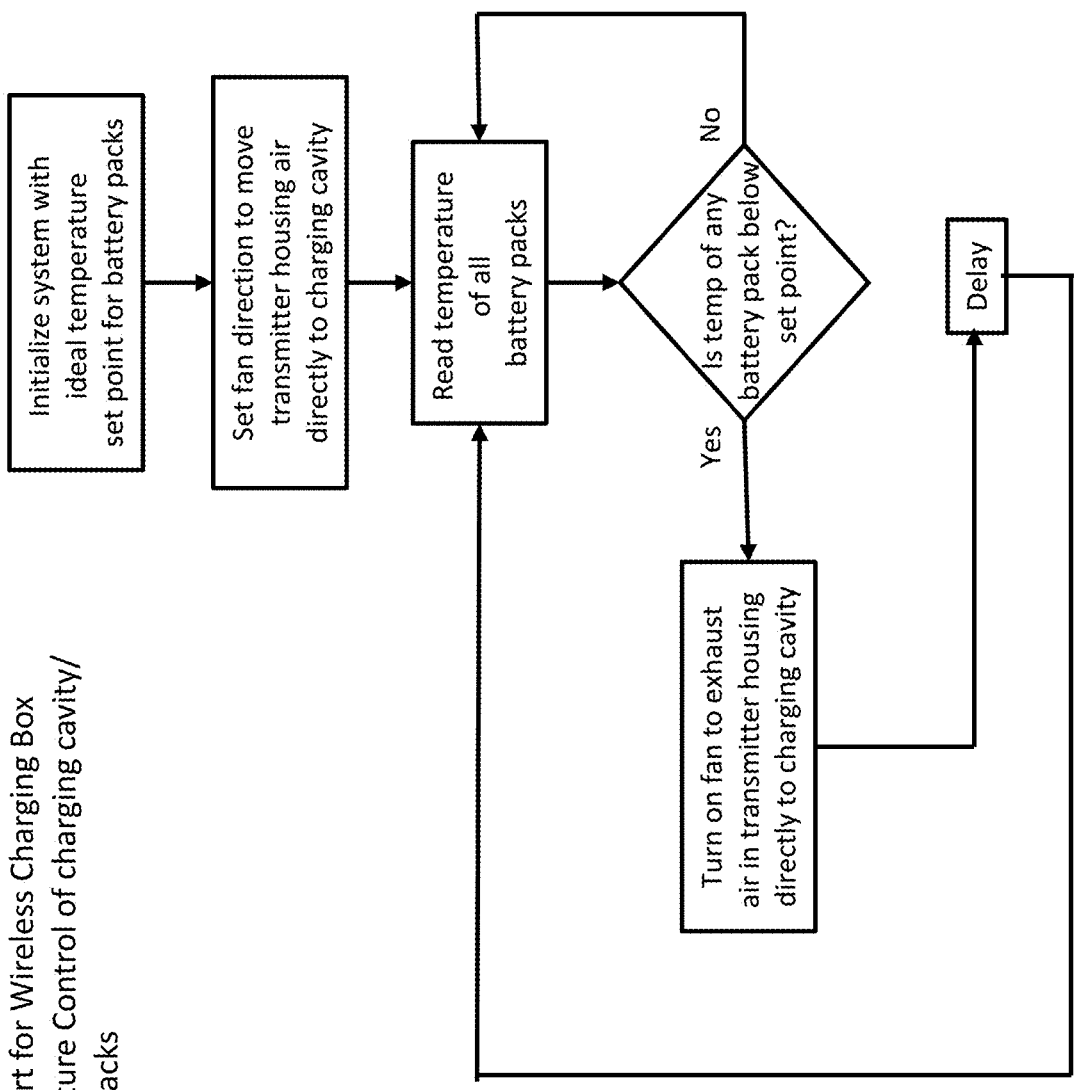
FIG. 10 is an exemplary flowchart for an operational feature of the wireless charger of FIG. 9.
Figure 11:
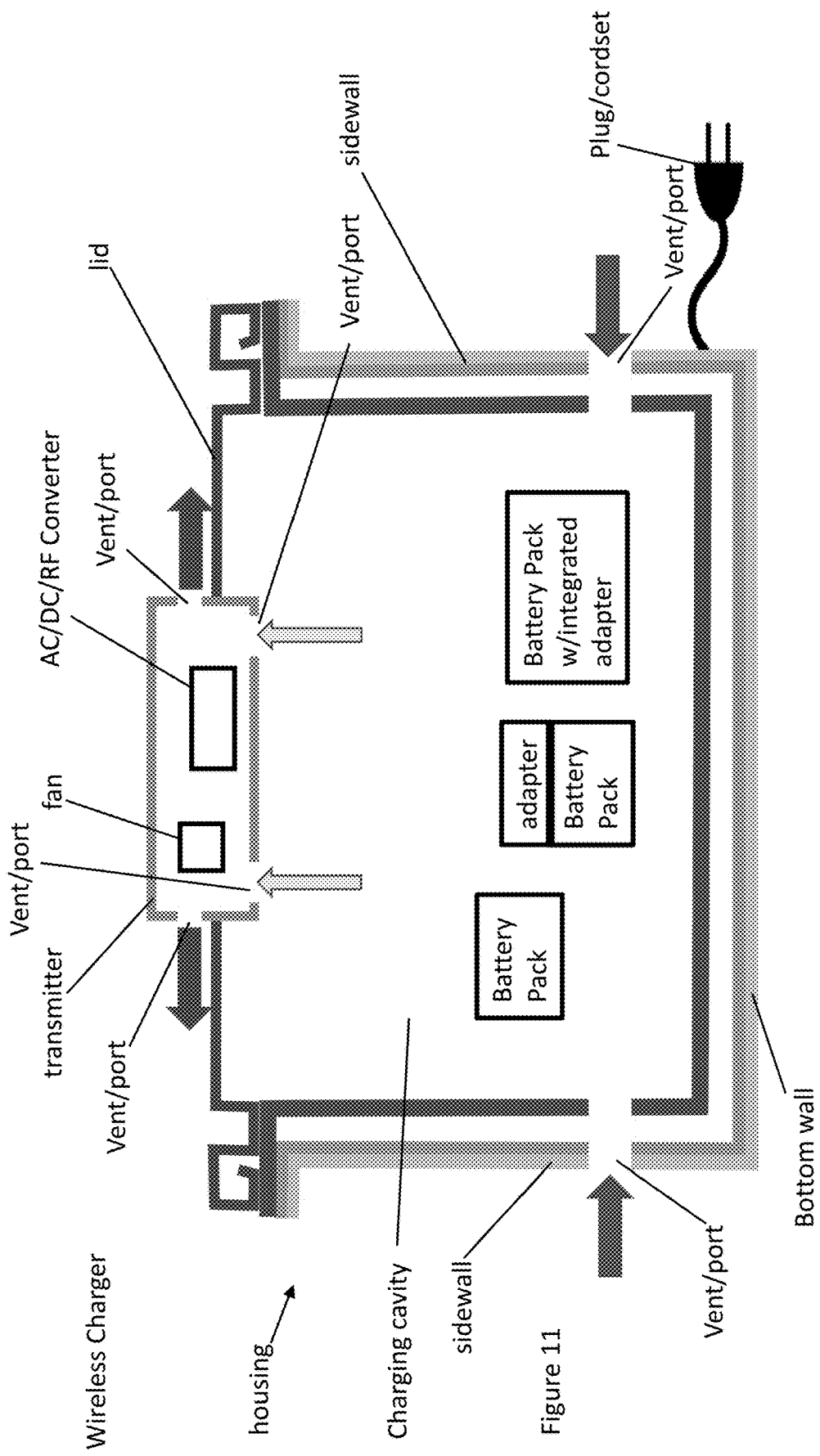
FIG. 11 is a section view along section line A-A of FIG. 4A of an exemplary embodiment of the wireless charger of FIG. 1.
Figure 12:
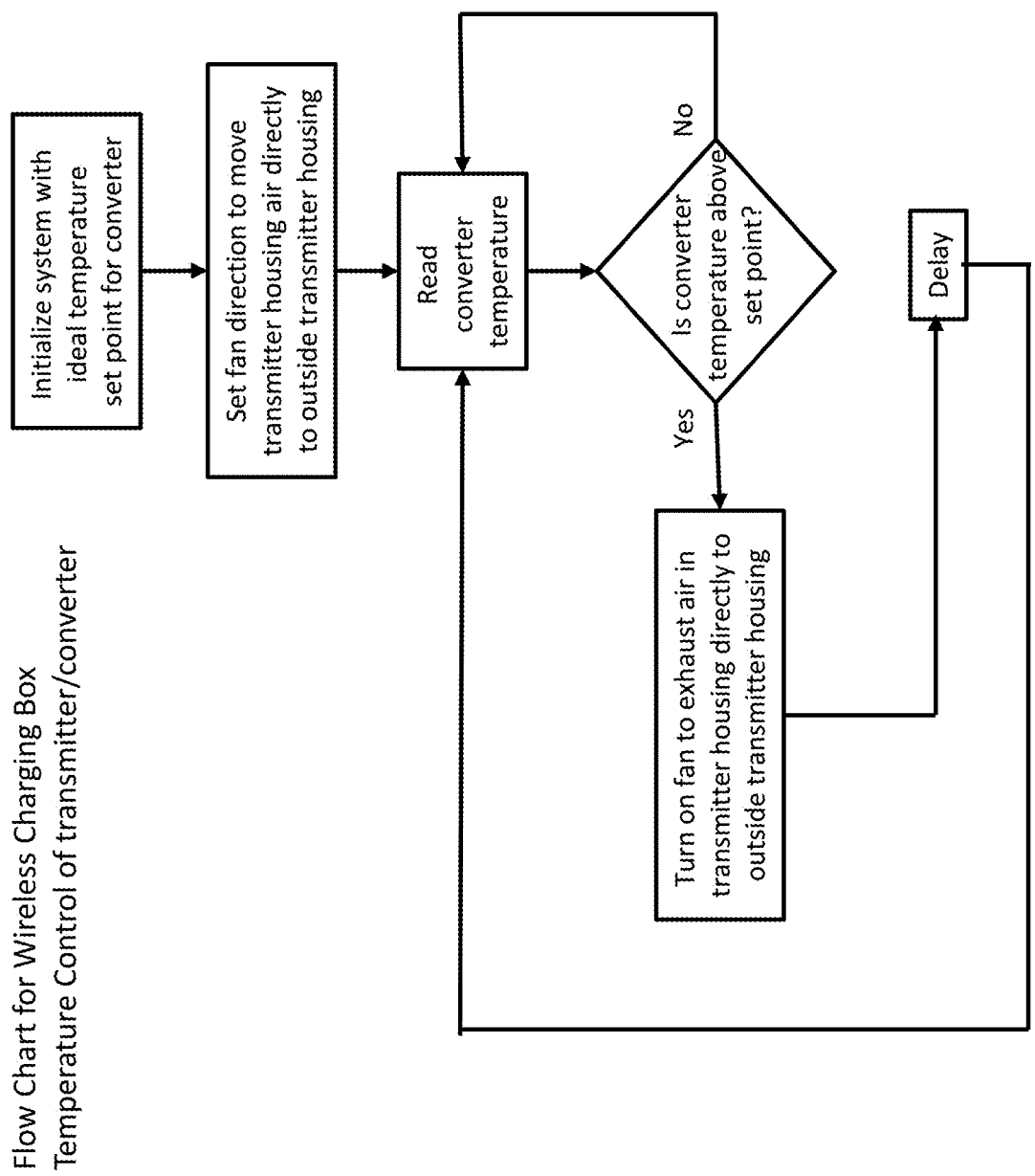
FIG. 12 is an exemplary flowchart for an operational feature of the wireless charger of FIG. 10.

In an exemplary embodiment illustrated in FIG. 9, a charging box provides features to enable operation/charging in cold charging conditions, e.g., below 10° Celsius for lithium ion cells. During operation, the transmitter produces waste heat and requires a forced convection cooling system, such as a fan and/or a heatsink to which the transmitter power components are attached. During use, the cooling air can be drawn (or blown) over the power components (AC/DC/RF converter) and then directed into the charging cavity. As temperatures climb (ambient or within the charging cavity), the fan can be reversed to bring ambient air into the charging cavity first and then through the transmitter to cool the power components, as shown in FIG. 11. Alternately, two fans could be used with one moving air from the transmitter into the charging cavity and then out to ambient air outside the charging box and with one moving ambient air from outside the charging box into the charging cavity and then into the transmitter and then out the transmitter. Only one fan would be active at a time.

Alternatively, a ducting system could be used to either divert air into the charging cavity or to ambient air outside the charging box. The diverter could be actively controlled (i.e. solenoid) or could use a bimetal actuator to direct flow to the desired location.

As is well known, batteries perform better when at optimal temperature (neither too hot or too cold). When left on a jobsite battery packs are usually not climate controlled. This system incorporates a fan system into a wireless charging box. In the conversion of AC electrical power to RF power heat is generated. This system can blow the heated air into the charging cavity to warm the battery packs.

Alternatively, the fan system could be run in reverse to draw relatively cool air from outside the charging box into the charging cavity (to cool the battery packs) and force the relatively cool air into the transmitter and exhaust hot air from the transmitter to outside the charging box to cool the converter.

When the temperature outside the battery box ($T_{amb}$) is relatively low, e.g., below 30° F. which results in the temperature inside the battery box to be relatively low, a fan in the transmitter box can be turned on to move waste heat from the AC/DC/RF converter into the battery box through one or more inlet vents to warm the batteries and cool the converter.

When the temperature inside the battery box ($T_{box}$) is relatively high, e.g., above 85° F. and higher than the temperature outside the battery box ($T_{amb}$), the fan in the transmitter box can be turned on to move cooler air from outside the battery box into the battery box through one or more inlet vents to cool the batteries and cool the converter.

In either of these scenarios the temperature outside the battery box ($T_{amb}$), the temperature of the converter ($T_{cr}$), the temperature inside the battery box ($T_{box}$) and the temperature of the battery packs ($T_{bp}$) can be taken into account to determine when to turn on the fan and the direction of the fan and airflow.

The vents should be less than a quarter wavelength of the RF frequency of the transmitted power to prevent the transmitted power from escaping the charging cavity.

It is desirable to be able to lock the lid of the charging box in order to securely store any tools and/or battery packs in the charging box. It is also desirable to lock the lid of the charging box to insure safe operation during charging.

Figure 13:
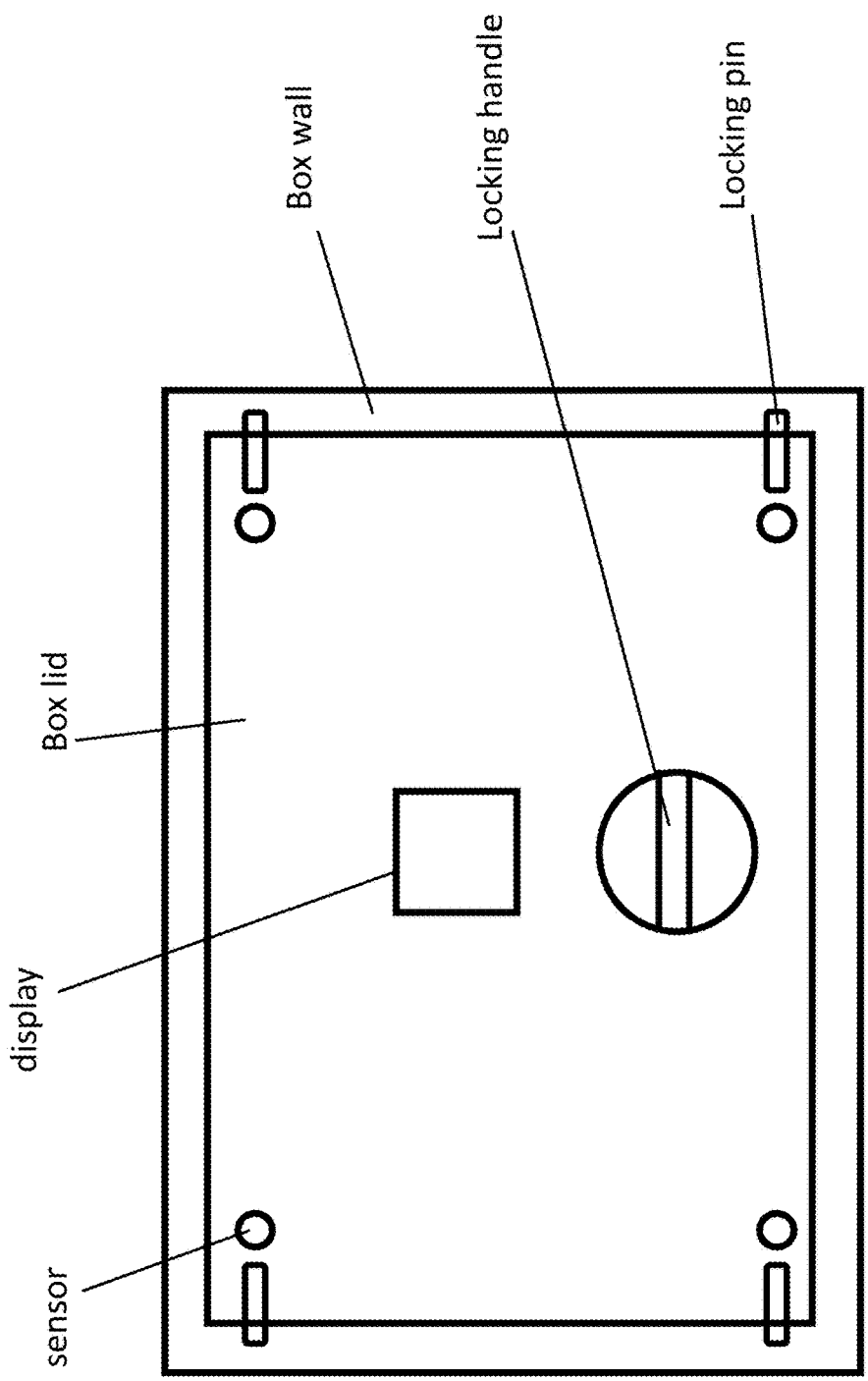
FIG. 13 is a top view of an exemplary embodiment of the wireless charger of FIG. 1.

In a first exemplary embodiment, a lock is implemented by a mechanical locking design. In this embodiment, illustrated in FIG. 13, the charging box includes a locking handle, preferably in the lid and a plurality of locking pins, also preferably in the lid. They charging box is configured such that the charging feature cannot be initiated or continued unless and until a user locks the lid to the box by turning the handle. The handle may be (1) connected physically to a locking mechanism or (2) connected to an electrical sensor that will result in a physical locking mechanism being engaged by another device. Additionally, a sensor underneath the box lid must be depressed before box can be energized. This provides a double redundant system. In this embodiment, when the handle is turned, the locking pins are moved to engage the sidewalls to fix the lid to the sidewalls.

Figure 14:
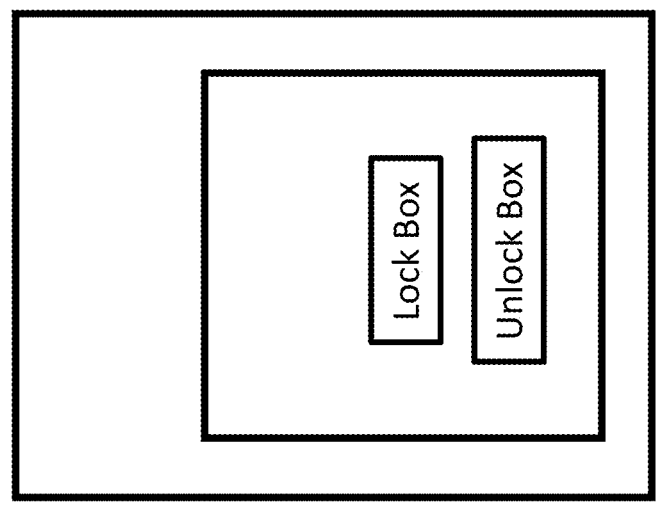
FIG. 14 is an illustrative rendering of a display of a mobile device.

In a second exemplary embodiment, a lock is implemented by an electronic "smart" lock. Using a similar mechanical construction as the first embodiment, a user may use a mobile app, e.g., DeWalt's ToolConnect app, to engage the locking device. A simplified display of a mobile app user interface is illustrated in FIG. 14. When using the mobile app, the user can press the "lock box" button of the user interface to signal the charging box to engage the locking pins to lock the box and the "unlock box" button of the user interface to signal the charging box to disengage the locking pins to unlock the box.

Alternatively, the box could include a sensor that senses the presence of a wireless charging battery pack (a battery pack including an integrated adapter/receiver) or an adaptor coupled to a standard battery pack in the box and automatically lock the box in response.

It is desirable to provide an asset management capability and functionality, such as DeWalt's ToolConnect app within the wireless charging box.

Figure 15:
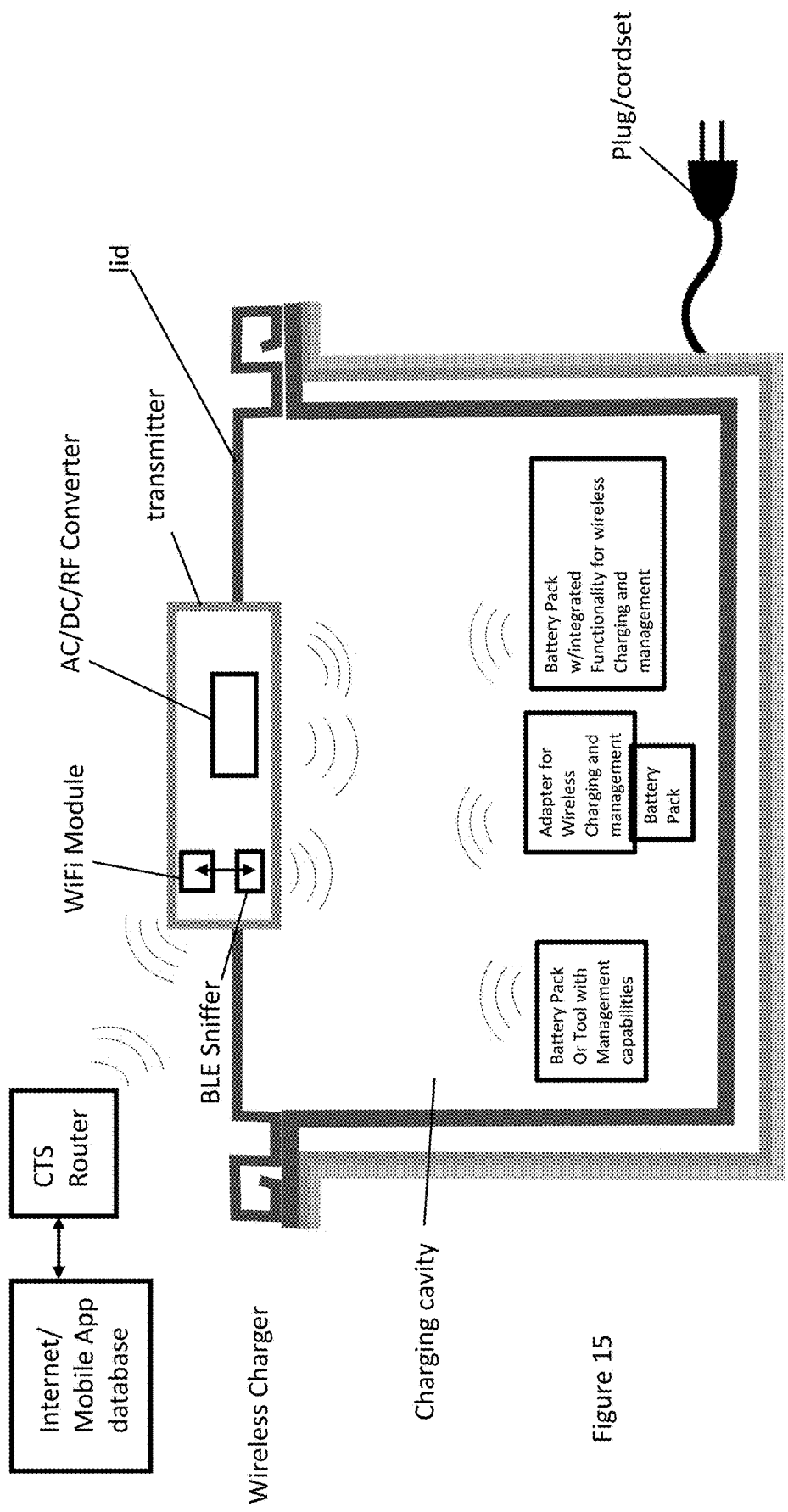
FIG. 15 is a section view along section line A-A of FIG. 4A of an exemplary embodiment of the wireless charger of FIG. 1.

In an exemplary embodiment, illustrated in FIG. 15, the charging box includes a Bluetooth low emission (BLE) "sniffer" within the transmitter of the charging box to determine the type and number of tools and/or battery packs present in the charging box and the status of these tools and/or battery packs. The information gathered about the tools and/or battery packs may be passed, via a wired connection to a Wifi module. The Wifi module may broadcast the gathered information to a router which may then pass the information to the internet. This type of solution is desirable as the charging box will be constructed to prevent RF signals/power from exiting the charging cavity.

As illustrated in FIG. 15, the charging box may receive a conventional battery pack having an adapter attached thereto, in which the adapter is capable of wirelessly charging the battery pack and includes tool/pack management functionality to determine information regarding the battery pack and wirelessly transmit such information. Alternatively, the tool/pack management functionality may be incorporated in the conventional battery pack; in which case the battery pack transmits the battery pack information to the adapter which in turn wirelessly transmits the information. In addition, the charging box may receive a battery pack including integrated functionality for wirelessly charging the battery pack and pack management. In addition, the charging box may receive tools and/or battery packs that are not capable of wireless charging but that include device management functionality for gathering information regarding the device and wirelessly transmitted that information. In this manner, the charging box can track and manage the tools, battery packs and other devices received in the charging box.

It is desirable to enable charging of non-battery pack devices in the charging box.

Figure 16:
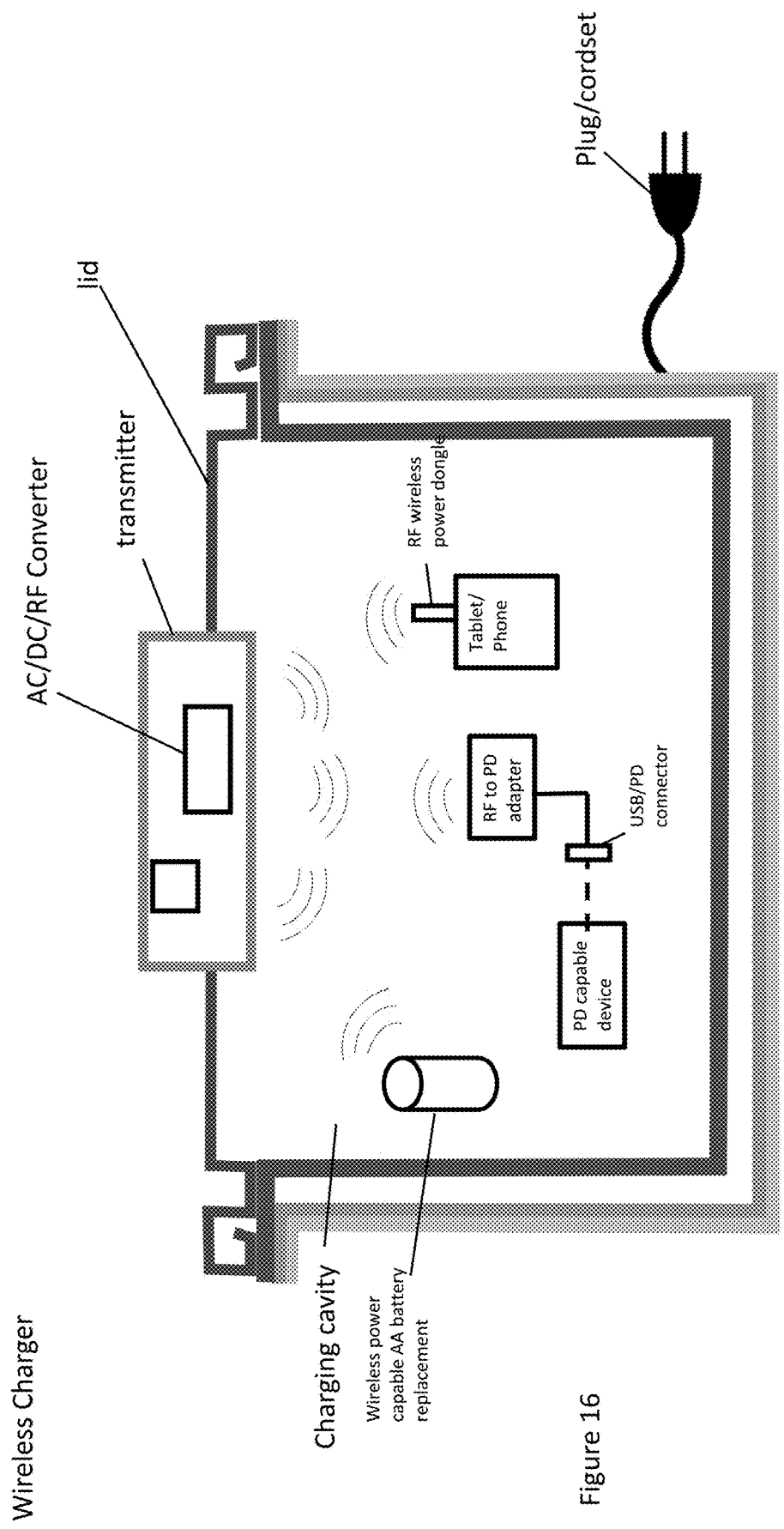
FIG. 16 is a section view along section line A-A of FIG. 4A of an exemplary embodiment of the wireless charger of FIG. 1.

In an exemplary embodiment of a system that enables wireless charging of various electronic devices, illustrated in FIG. 16, the system includes the wireless charging box and RF receiver dongles, cases, adapters, etc. that can receive power from the wireless charging box and charge other devices common on jobsites.

Adapters to receive RF power and convert the RF power to "standard" outputs could be included to allow users to utilize the box for other devices that are common on jobsites.

These devices may include mobile phones, tablets, rechargeable battery cells, e.g., D type cells, AAA type cells, and/or power delivery (PD) standard devices.

When charging an intended receiver (adapter attached to a battery pack or integrated into a battery pack) within the charging box, some the transmitted energy may escape the charging box and some may be absorbed into items other than the receiver placed inside the charging box. It is desirable to minimize the amount of this "wasted" energy for both safety and efficiency purposes.

The system can include sensors and circuitry to measure and store data regarding an amount of power transmitted over time. The receivers can also include sensors and circuitry to measure and store data regarding the amount of power received over time.

Figure 17:
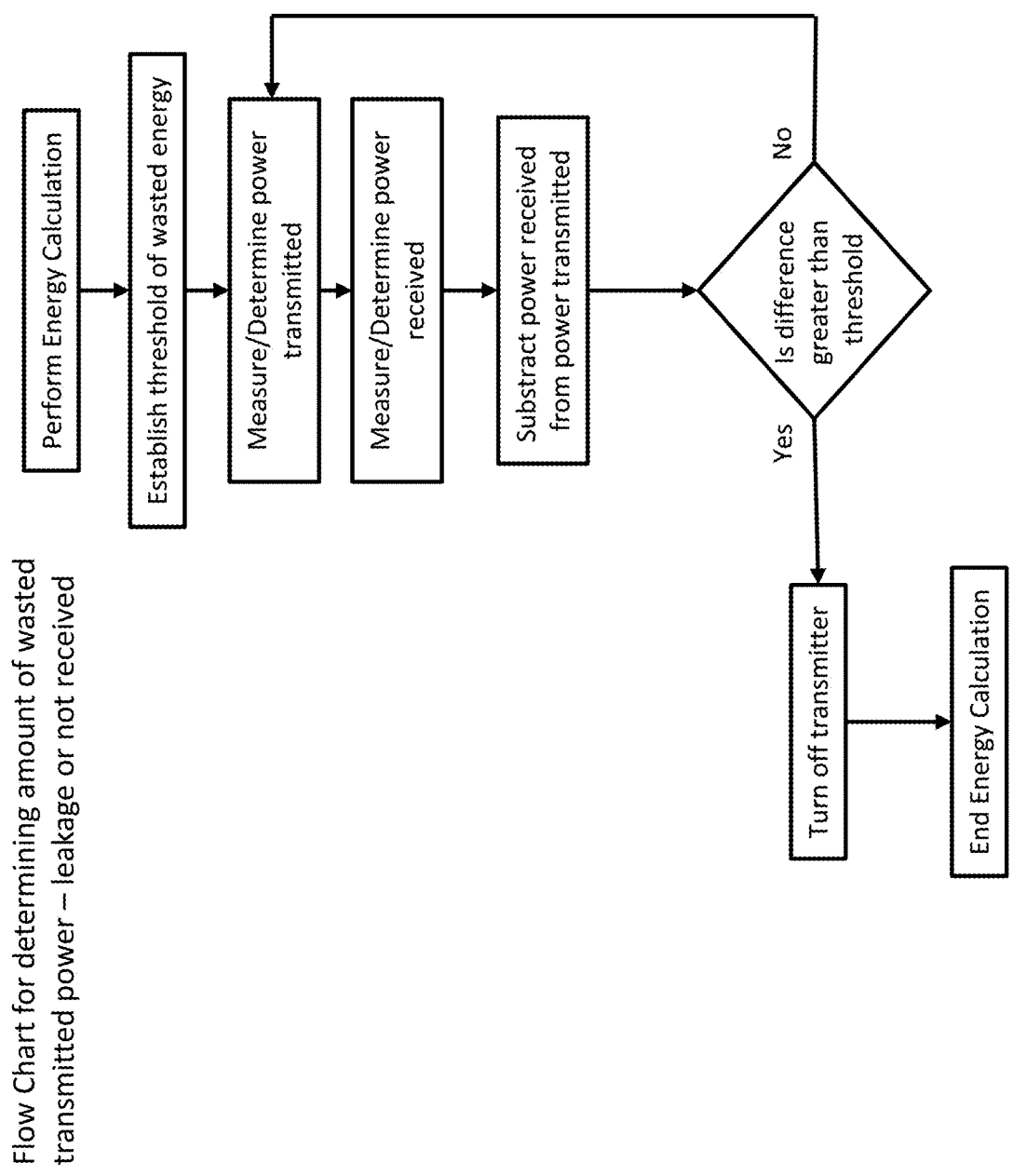
FIG. 17 is an exemplary flowchart for an operational feature of the wireless charger of FIG. 1.

A first method of determining the wasted energy—as set forth in the flow chart of FIG. 17—includes the steps of establishing a threshold of wasted energy (the threshold could be an amount of energy or a percentage of energy transmitted), measuring/determining the amount of power transmitted by the transmitter, measuring/determining the amount of power received by the receivers, subtracting the power received at the receivers from the power transmitted by the transmitter, determining if the difference between the amount of energy transmitted by the transmitter and the amount of energy received by the receivers is greater than the threshold. If the difference is less than the threshold than the transmitter may continue transmitting until it is stopped by the charging scheme. If the difference is greater than the threshold than the transmitter is turned off to stop transmitting energy.

In a second method, the system includes a temperature sensor in the box and includes the steps of measuring the temperature during energy transmission. If the temperature exceeds a predetermined threshold or the rate of temperature rise exceeds a predetermined threshold than the transmitter would be turned off.

In a third method, the system includes a thermal imaging camera and includes the steps of monitoring the thermal footprint of the cavity of the box and if the footprint shows evidence of excess absorption of energy then the transmitter is turned off.

Numerous modifications may be made to the exemplary implementations described above. These and other implementations are within the scope of this application.

The invention clamied is:

1. A wireless charging system, comprising:
   a box including a lid, four sidewalls and a bottom wall forming an internal cavity having a volume;
   a transmitter integrated in the lid for transmitting RF power into the internal cavity;
   a power cord and a plug for connecting to a source of AC power;
   an AC to DC to RF converter for generating RF power from AC power.

2. The wireless charger of claim 1, wherein the lid is attached to one of the sidewalls by a hinge to seal the internal cavity.

3. The wireless charger of claim 1, a receiver in the internal cavity for receiving the generated RF power.

\* \* \* \* \*